United States Patent [19]

Verwilst et al.

[11] Patent Number: 4,822,549
[45] Date of Patent: Apr. 18, 1989

[54] METHOD FOR PREPARING A SHAPED LAYER BY GUN SPRAYING

[75] Inventors: Jacques Verwilst; Lucien Jourquin, both of Wetteren, Belgium

[73] Assignee: "Gechem", Brussels, Belgium

[21] Appl. No.: 26,330

[22] PCT Filed: Jul. 8, 1986

[86] PCT No.: PCT/BE86/00021
§ 371 Date: Mar. 16, 1987
§ 102(e) Date: Mar. 16, 1987

[87] PCT Pub. No.: WO87/00482
PCT Pub. Date: Jan. 29, 1987

[30] Foreign Application Priority Data

Jul. 15, 1985 [LU] Luxembourg .................. 86007

[51] Int. Cl.⁴ .................. B29C 41/08; B29C 41/42; B29C 63/22
[52] U.S. Cl. .................. 264/250; 264/257; 264/267; 264/309; 264/313; 264/316
[58] Field of Search .............. 264/219, 220, 224, 225, 264/226, 227, 309, DIG. 72, 313, 316, 318, 46.6, 46.4, 255, 267, 250, 257

[56] References Cited

U.S. PATENT DOCUMENTS

| | | | |
|---|---|---|---|
| 2,113,166 | 4/1938 | Zinser | 264/220 |
| 3,187,069 | 6/1965 | Pincus | 264/46.8 |
| 3,347,966 | 10/1967 | Seefluth | 264/535 |
| 3,410,936 | 11/1968 | Juras | 264/128 |
| 3,428,725 | 2/1969 | Delmonte et al. | 264/226 |
| 3,487,134 | 12/1969 | Burr | 264/226 |
| 3,576,930 | 4/1971 | Watters et al. | 264/553 |
| 3,784,451 | 1/1974 | Garner | 264/225 |
| 3,883,627 | 5/1975 | Fitts | 264/220 |
| 4,098,856 | 7/1978 | Rosenau | 264/80 |

FOREIGN PATENT DOCUMENTS 1418114 10/1965 France .
1066440 4/1967 United Kingdom .

OTHER PUBLICATIONS

"Flexible Urethane Molds for the Furniture Industry" by G. T. Morse, SPE Journal Jun. 1969 vol. 215, p. 53.

Primary Examiner—James Lowe
Assistant Examiner—Jeremiah F. Durkin
Attorney, Agent, or Firm—Sughrue, Mion, Zinn, Macpeak, and Seas

[57] ABSTRACT

Method for preparing a shaped part, from a flexible plastic material, from a particular pattern, which comprises first forming by gun-spraying, a layer (6) plastic material over a shaping surface from a first mould (11) corresponding to an outline distorted along continuous lines, of the visible surface impression (12) of said pattern, and then stripping the layer of plastic material from the mould, laying said layer (6) inside a second mould the shaping surface of which coincides with the shape of the pattern visible surface.

16 Claims, 4 Drawing Sheets

METHOD FOR PREPARING A SHAPED LAYER BY GUN SPRAYING

BACKGROUND OF THE INVENTION

There are presently a number of techniques for making such shaped layers from plastic material.

For instance, a generally-used technique is heat-shaping, in which a thermoplastic material sheet is heated above the softening temperature thereof and is thereafter distorted inside a mould, corresponding to the negative impression of the desired pattern, either under vacuum action, or by mechanical means, or a combination of both means. This relatively simple technique has however for drawback to be usable in principle but for manufacturing shaped casings or coverings with a not very complex form and a uniform texture. Moreover this technique is limited to the use of plastic materials with a relatively low softening point, in such a way that when said shaped casings or coverings undergo thereafter heating to a temperature about 120° C., the memory effect has a chance to cause distorting of said casings and coverings, which results for example in loosening from the support they are applied on.

Another generally-used technique is the one known as "Slush-moulding" and which comprises filling completely the cavities from a tray-like mould with a liquid synthetic material, such as PVC plastisols.

When contacting the hot mould walls, said material solidifies by forming a film on said walls. The mould is then turned over to remove the excess still liquid synthetic material and cooled to allow stripping the resulting skin. This is usually a rather cumbersome technique which does moreover consume a lot of energy and which subjects the moulds to damaging heat impacts.

A third technique is gun-spraying which comprises spraying a liquid plastic material, diluted or not in solvents, or liquid components which will form by reacting in situ, a polymer, over a mould surface to form thereby thereon a solidified plastic material film.

Said latter technique usually allows to obviate some of the drawbacks from both above-described techniques, but can however be applied only when all the portions from the surface to be coated with the film are easily accessed by the spray from the gun being used to project the liquid plastic material. Thus it is known, by making use of a flexible mould secured with the circumference thereof to a rigid holder the inner shape of which corresponds to the outer shape of the flexible mould, to turn said flexible mould inside out to make the inner surface thereof easily accessed by the gun spray to form thereby over said surface, a flexible plastic material layer, and to then return said mould to the original position thereof which corresponds to the shape of the rigid holder, which is the shape desired for said layer.

Such a technique which appears at first very simple, is not however generally suitable for flexible moulds having a counter-taper, as in such a case it will be substantially impossible to return the mould to the original position thereof and thus to obtain a flexible layer from flexible material having accurately the required shape. Moreover due to the continuous turning inside-out and righting-up of said flexible mould, this one will wear out very fast and will thus not allow reproducing in the plastic material layer the visible surface texture with the required accuracy. Consequently this technique is not generally suitable for manufacturing casings or coverings with narrow and deep cavities, as it is for example the case in some fittings for automotive vehicle dashboards.

One of the essential objects of this invention lies in providing a very simple method which allows obviating this gap in the gun-spraying technique and which is usable without any problem, for preparing shaped layers from plastic material according to a pattern having substantially any shape.

SUMMARY OF THE INVENTION

For this purpose, the method according to the invention comprises using to form the plastic material layer, a first mould, the shaping surface of which corresponds to said outline distorted along substantially continuous lines, of the visible surface impression of said pattern, to then strip said plastic material layer from the mould, and laying same in a second mould the shaping surface of which substantially coincides with the shape of the visible surface of said pattern.

This invention relates to a method for preparing a shaped part, from a plastic material which is flexible or can be made flexible, from a particular pattern, which comprises forming by gun-spraying, a plastic material layer over a shaping surface inside a mould, said surface corresponding to an outline distorted along substantially continuous lines, of the impression of the visible surface from said pattern, in such a way that substantially all the surface portions of said mould be accessible to gun-spraying, said flexible or flexible-made layer then being distorted until obtaining a shaped part comprised of a plastic material layer the visible surface of which substantially corresponds to the one of said pattern.

It is more particularly a shaped layer from a plastic material which is or can be made flexible, according to a particular pattern, having a very uneven shape and a varying surface appearance, such as a dashboard fitting and door panels for automobile vehicles, etc.

Advantageously, use is made of a substantially rigid mould, notably from metal.

In a particular embodiment, there is applied by gun-spraying, a mixture of a polyol and an isocyanate over the shaping surface of the first mould, to obtain in situ a flexible polyurethane layer.

Other details and features of the invention will stand out from the following description, given by way of non limitative examples and with reference to the accompanying drawings, of a few particular embodiments of the method according to the invention.

BRIEF DESCRIPTION OF THE DRAWINGS

In the various figures, the same reference numerals show identical or similar elements.

DETAILED DESCRIPTION OF THE INVENTION

The invention pertains to a particular preparation method by gun-spraying, of a shaped layer from plastic material according to a specific pattern and the outer surface of which has substantially the same texture, structure or appearance as the outer surface of said pattern.

This is more particularly a method which actually allows to model the outer shape and texture of parts with very varied shapes, from patterns or prototypes, by applying the known-per-se gun-spraying technique.

Generally, the method according to the invention comprises applying by gun-spraying a layer plastic material or components which form in situ the plastic material, over a shaping surface from a first mould, to form a preliminary mould.

Said plastic material should have for property to form a layer or a film which is flexible or can be made flexible, that is the shape of which can easily be changed, without the surface area in every direction being changed, for example by folding.

The shaping surface of the first mould corresponds to an outline distorted along substantially continuous lines, of the impression of the pattern visible surface, notably the negative impression of the pattern outer visible surface, in such a way that all the portions from said surface be easily accessed by the gun spray. Thus the distortion may advantageously be such that generally the concave portions from the negative impression of the pattern visible outer surface may remain concave in the distorted outline. It is simply necessary for all the portions to be easily accessed for the gun-spraying.

More particularly, it may thus be a part or complete developing of the outer visible surface of the pattern.

The plastic material layer formed over said surface is then after stripping from the mould, applied inside a second mould which comprises a finishing mould and the shaping surface of which substantially coincides with the negative shape of the pattern outer visible surface, to thus obtain a shaped plastic material layer the outer visible surface of which is substantially identical with the pattern one.

In this description, there is generally designated with "shaping surface", that mould surface whereover a product is formed by casting, gun-spraying or any other known-per-se method, in such a way that said shaping surface comprises the negative impression of said product surface. The wording "textured surface" designates a product such as leather, showing some structure or a raised or sunk design.

Figure 1:
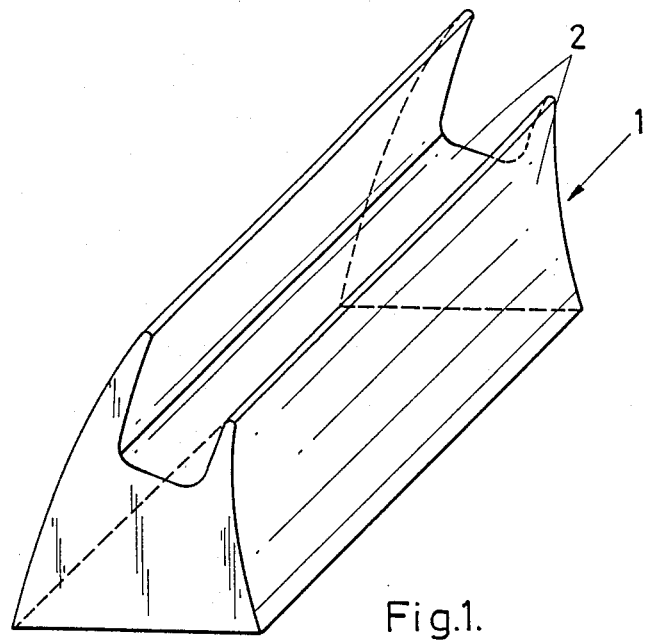
FIG. 1 is a perspective view of a pattern according to which a shaped layer from plastic material is prepared.

FIG. 1 shows by way of example, a pattern 1 the outer visible surface 2 of which is either textured or smooth. Said surface may for example be leather-like or more simply be made of leather.

Figure 2:
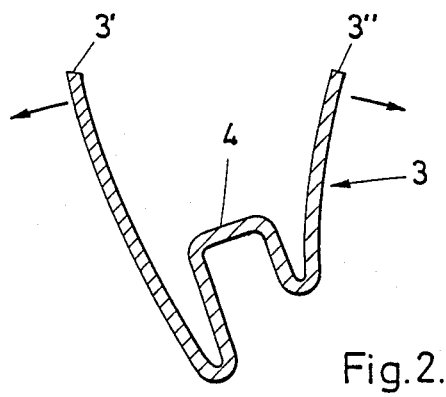
FIGS. 2 to 6 diagrammatically show the various steps in a first embodiment of the method according to the invention.

According to the invention, there is first prepared as shown in FIG. 2, from pattern 1, an intermediate part 3 the inner surface 4 of which shows the negative impression of the outer textured surface 2 of said pattern. Said part 3 is comprised of a sheet flexible material, notably an elastomer, which is shaped according to the pattern outer shape.

Figure 3:
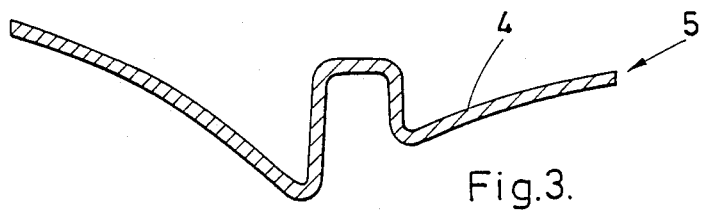

Then as shown in FIG. 3, said sheet is distorted and this is done in such a way as to make every portion from the inner surface 4 thereof easily accessed by the gun spray.

Said thus-distorted sheet 5 can in some cases, be used directly as first mould; for example when said sheet is stiff enough. This has been shown in FIG. 4.

Figure 5:
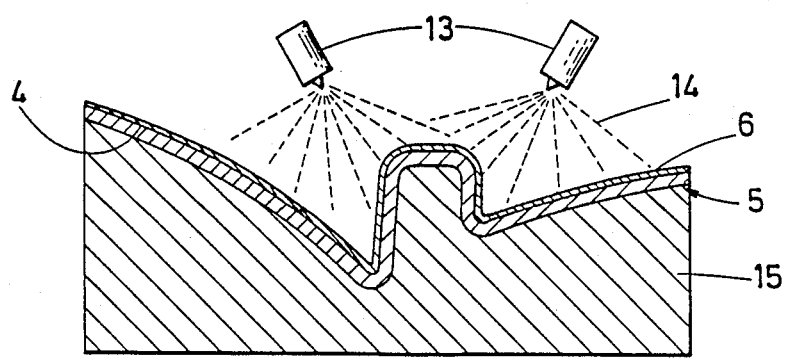

In the other case, when the stiffness is not enough, the sheet 5 is arranged over a supporting mould 15, as shown in FIG. 5.

When said conditions have been fulfilled, one can apply by gun-spraying, a layer 6 plastic material or components forming in situ said plastic material, over the surface 4 of said thus-distorted sheet 5, thus forming the shaping surface from the first mould.

Figure 6:
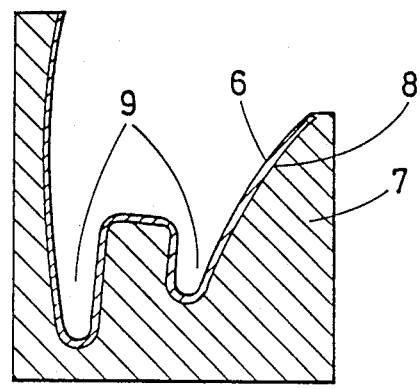

Said flexible layer 6 plastic material is then arranged inside a second mould 7 the shaping surface 8 of which substantially coincides with the one of the negative form of the outer visible surface 2 from pattern 1, to thus obtain a shaped layer plastic material the outer visible surface of which is substantially identical with the pattern surface (see FIG. 6).

It is to be noted that the shaping surface 8 from the second mould 7 does not necessarily have to show the texture of the outer visible surface 2 from pattern 1; it may for example be absolutely smooth, because the layer plastic material 6 formed on surface 4 of the distorted sheet 5, will already have said texture.

The following operation will then comprise filling the cavities 9 from the layer plastic material 6, shaped inside said second mould 7, with a padding which is preferably comprised of polyurethane foam or a substantially similar material. Reinforcing parts might possibly be embedded in said padding. Such padding operation is advantageously performed under pressure while the shaped layer plastic material 6 lies inside the second mould 7; it has however not been shown in the figures as this is actually a conventional operation known per se.

Said first uncostly embodiment is ideal for making prototypes or small series. Generally, due to the flexible nature of such a mould, the texture of the outer visible surface from that layer plastic material formed on said first mould is unclear and not very accurate.

Moreover such a flexible mould wears out rather fast.

For instance even if in some rather exceptional cases, a first flexible mould might be suitable, the invention has mainly for object, for example when said first mould will be used to make a rather large number of shaped layers or parts from plastic material 6, to use a first mould from an essentially rigid material, notably from metal, and this for example by electroplating.

Figure 7:
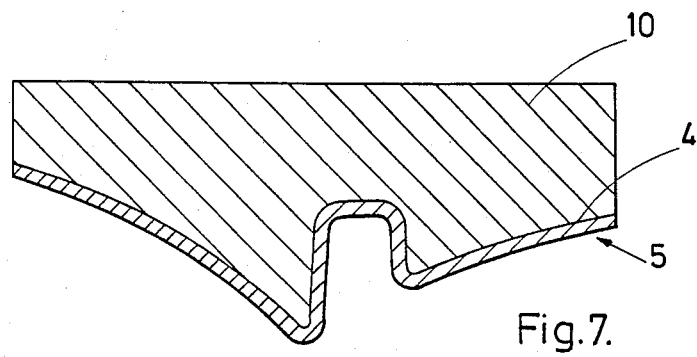
FIGS. 7 to 10 show a variation of this embodiment.

In this aspect as shown in FIG. 7, one takes a new impression from the inner surface 4 of the distorted sheet 5 by forming thereon a counter-mould 10. Said counter-mould may for example be obtained by casting over said sheet surface 4, a plastic material which is liquid enough to enter the texture of said surface 4 and form by polymerizing, a relatively hard and undistortable material. This may notably be an epoxy resin.

Figure 8:
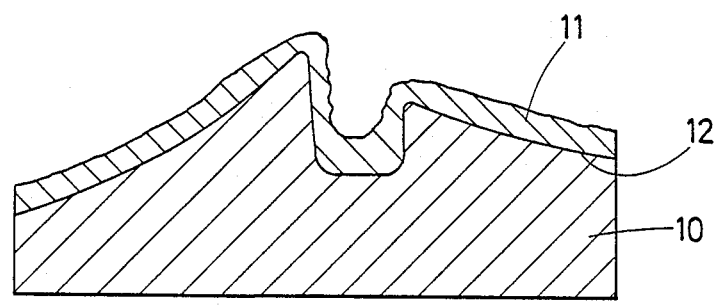

After stripping the sheet 5 from the counter-mould 10, one lays by electroplating over the new impression 12, provided by said counter-mould, a metal layer 11 (see FIG. 8).

Said metal layer 11 with a thick enough thickness, is stripped from said counter-mould and thus forms said first mould from lasting material.

Figure 4:
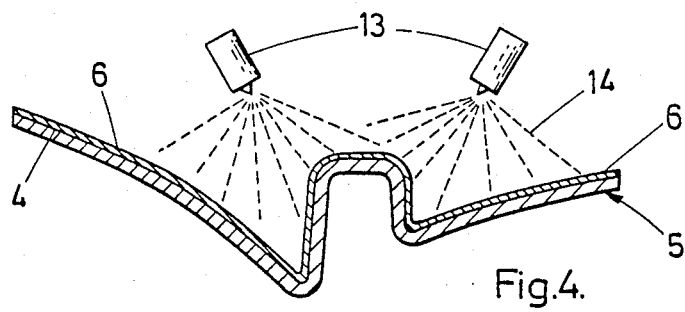

The following operations correspond to the above-described ones relative to FIGS. 4 to 6. Thus over the textured surface 12 from said first mould from lasting material, which is thus identical to the textured surface 4 of the distorted sheet 5, one sprays by means of spray-guns 13, a liquid plastic material 14 of the components thereof, to form over said textured surface 12, a layer plastic material 6 which polymerizes or hardens in the open air, possibly with the provision of calories (see FIG. 9).

Figure 10:
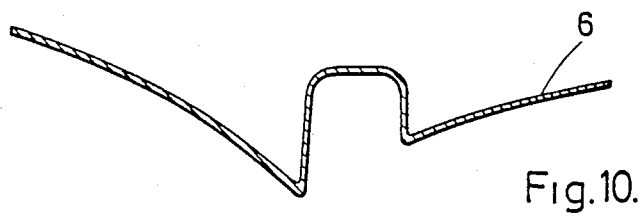

After hardening or polymerizing, said layer plastic material 6 is stripped from the mould, as shown in FIG. 10, and conveyed to the second mould 7 wherein it is folded against the shaping surface 8 thereof, to take accurately the shape of the outer surface 2 from pattern 1.

Figure 9:
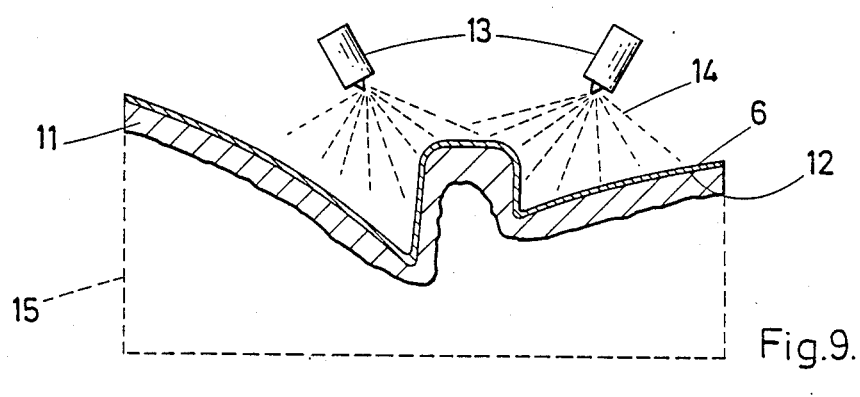

When required during gun-spraying, the metal layer 11 can be laid on a supporting mould 15 as shown in broken lines in FIG. 9.

This operation is then followed by the padding operation as already described hereinabove.

The moulds 7 and 15 may be comprised of the same material as the counter-mould 10, such as a resin, or be made from plaster or else be formed by a laminated shell, possibly reinforced with an armature.

To go from the shape of the intermediate part 3 in FIG. 2 to the partly-developed shape of sheet 5 as shown in FIG. 3, one may use any known system, notably the vacuum technique or else mechanical means exerting a pull on the edges 3' and 3'' from part 3, as shown with arrows.

The intermediate part 3 is generally made on the basis of a rubber with an elasticity modulus lower than or equal to 100 MPa, according to standards DIN 53423, and a Shore hardness between Shore A=23 and Shore D=45, while the sheet thickness that part is made of, generally lies between 1 and 50 mm.

Advantageously, said thickness lies between 3 and 15 mm and the material said part is made of, is preferably based on rubber having an elasticity modulus lower than or equal to 30 MPa and a Shore hardness lying between 30 and 85 Shore A.

As such rubbers have an elasticity not to be neglected, it may advantageously be of interest to reinforce same with a flexible reinforcement having a negligible elongation coefficient. Such reinforcement thus prevents the part 3 lengthening as it is distorted.

Said intermediate part 3 can be prepared by the casting technique or the gun-spraying technique.

To obtain a negative impression from the outer visible surface 2 of pattern 1, said surface is advantageously treated with a stripping agent before forming thereon the intermediate part 3.

The second mould 7 may be made according to the invention, in at least two rigid parts which are movable relative to one another to thus allow stripping easily the shaped layer 6 after padding.

Some practical examples are given hereinafter for plastic material compositions, as regards preparing both the intermediate part 3 and the shaped part 6 according to a determined pattern.

EXAMPLE 1

Figure 11:
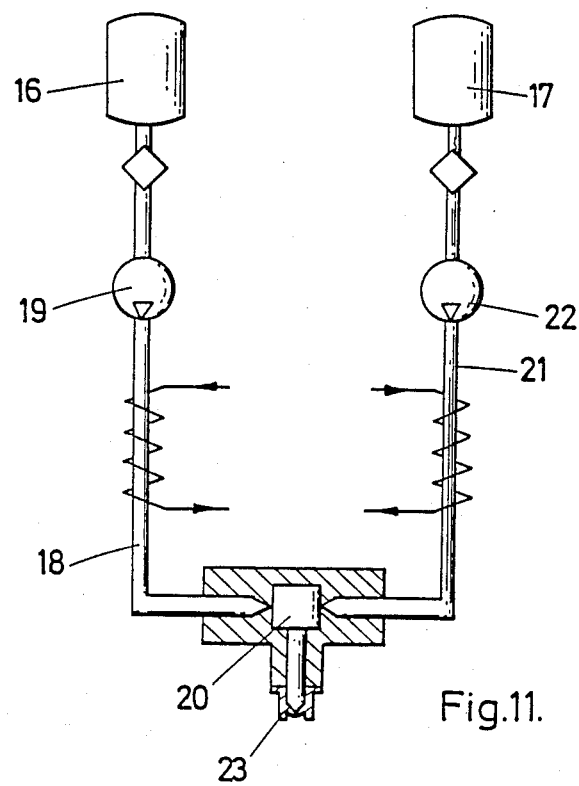
FIG. 11 is a diagrammatic showing of a gun-spraying device with two components.

This example pertains to preparing a composition from a light-stable polyurethane elastomer, the catalytic system of which has been patented by the Applicant, which can be applied by the gun-spraying technique. This is a polyurethane elastomer which can be applied by guns for two components, as shown in FIG. 11. The first component is for example comprised of a polyol and stored in a tank 16. The other component comprised of isocyanate, is contained in a tank 17. The tank 16 is connected through a line 18, whereon a metering pump 19 is mounted, to a mixing chamber 20, while the tank 17 is connected by a line 21, whereon a metering pump 22 is mounted, to said same mixing chamber 20. There is then connected to said chamber 20, a projection head 23, wherethrough the isocyanate and polyol are sprayed in intimate mixture to thus form in situ the corresponding polyurethane.

| (1) Polyol characteristics (first component) | |
|---|---|
| Formula (parts by weight) | |
| Polyether triol obtained by adding propylene oxide and ethylene oxide to glycerol as initiator (OH index: 35; OH prim. radicals: 80%) | 100 |
| Ethylene glycol: | 5 |
| NN'—dimethylbutane diamine: | 5 |
| Lead octoate (33% metal Pb): | 0.7 |
| Colouring paste: | 5 |
| | 115.7 |
| Properties | |
| Viscosity at 25° C. in MPa: | 1170 |
| Viscosity at 45° C. in MPa | 300 |
| Viscosity at 65° C. in MPa | 150 |
| Density (21° C.) | 1.02 |
| (2) Isocyanate characteristics (second component) | |
| Formula (parts by weight) | |
| Quasi-prepolymer (100 parts isophorondiisocyanate + 13.28 parts dipropylene glycol — final NCO-group proportion: 26%) | 67.1 |
| Dimethyl stanodineodecanoate: | 1 |
| | 68.1 |
| Properties | |
| Viscosity at 25° C. in MPa: | 1450 |
| Viscosity at 45° C. in MPa: | 350 |
| Viscosity at 65° C. in MPa: | 50 |
| Density (21° C.) | 1.07 |

$$\text{Ratio} \frac{\text{Polyol compound}}{\text{Isocyanate compound}} = \frac{115.7}{68.1} = 1.7$$

The mould-stripping time for a 60° C. mould temperature, was less than one minute.

| (3) Properties of the final product: | |
|---|---|
| | Test Method |
| Elongation at rupture (%): 230 | ASTM D412 |
| Tensile strength (MPa): 5.8 | ASTM D412 |
| Tearing strength (N/cm): 210 | ASTM D624 |
| Shore A: 70–75 | — |
| Specific weight (g/cm$^3$): 1.0 | |

EXAMPLE 2

The elastomer composition being used for preparing intermediate part 3 is comprised of an aromatic polyurethane which is also applied by gun-spraying by means of the device as shown in FIG. 10.

| 1. Polyol characteristics (first component) | |
|---|---|
| 1. Formula | |
| Polyether triol with the same type as in example 1: | 90 |
| Dabco 33 Lv (triethylene diamine; 33% in solution in DPG): | 2.25 |
| Butane diol: | 7.9 |
| Colouring paste: | 5 |
| | 105.15 |
| Properties | |
| Viscosity at 25° C. in MPa: | 1060 |
| Viscosity at 45° C. in MPa: | 320 |
| Density (21° C.) | 1.02 |
| 2. Isocyanate characteristics (second component) | |
| Formula | |
| Isocyanate RMA 200 (Upjohn): | 43.5 |
| Properties | |
| Viscosity at 25° C. in MPa: | 620 |
| Viscosity at 45° C. in MPa: | 126 |
| Density (21° C.) | 1.21 |

$$\text{Ratio} \frac{\text{Polyol compound}}{\text{Isocyanate compound}} = \frac{105.15}{43.5} = 2.42$$

The mould stripping time is less than 3 minutes for a 60° C. mould temperature.

| (3) Properties of the final product: | |
|---|---|
| | Test Method |
| Elongation at rupture (%): 335 | ASTM D412 |
| Tensile strength (MPa): 4.9 | ASTM D412 |
| Tearing strength (N/cm): 210 | ASTM D624 |
| Shore A: 65-70 | — |
| Specific weight (g/cm³): 1.0 | |

EXAMPLE 3

The intermediate part 3 is comprised of a polyurethane elastomer obtained by the casting technique.

Use is made of two components, a first component based on a polyol, and a second component formed by a prepolymer, which are mixed thoroughly under vacuum, to avoid air bubble inclusion. The resulting mixture has a relatively high viscosity and can be applied as succeeding layers on the pattern.

| The first component has the following formulation: | |
|---|---|
| Polyol (Dow SA 1550) | 53.00 |
| Calcinated clay: | 20.00 |
| Silica: | 26.25 |
| Lead octoate: | 0.40 |
| Phenyl mercurial acetate: | 0.035 |
| | 100 |
| The second component has the following formulation: | |
| DPG (dipropylene glycol) | 18.00 |
| T 80 (toluene diisocyanate) | 82.00 |
| | 100.00 |

$$\text{Ratio} \frac{\text{Polyol compound}}{\text{Isocyanate compound}} = \frac{100}{11.9} = 8.4$$

| Properties of the final product: | |
|---|---|
| | Test method |
| Elongation at rupture (%): 160 | ASTM D412 |
| Tensile strength (MPa): 2.0 | ASTM D412 |
| Tearing strength (N/cm): 50 | ASTM D624 |
| Specific weight (g/cm³): 1.7 | — |
| Shore A: 62 | |
| Shrinkage (%): 0.4 | |

EXAMPLE 4

The intermediate part 3 is comprised of silicone rubber from type RTV 700 Cat.B5:100/15 (GE products).

The technique being used to prepare this rubber is the same as the one being used for preparing the polyurethane rubber according to example 3.

| Properties | Test methods |
|---|---|
| Specific weight: 1.4 to 1.5 | — |
| Shore A: 35 | — |
| Elongation (%): 400 | ASTM D412 |
| Tensile strength (MPa): 4.1 | ASTM D412 |
| Tearing strength (N/cm): 250 | ASTM D624 |
| Shrinkage (%): 0.3 | — |
| Example of a reinforcement for intermediate part 3: | |
| (1) Textile fabric from polyester fibers: | |
| Elongation (%): | |
| −12.5 (warp) | |

| Properties | Test methods |
|---|---|
| −13.5 (weft) | |
| Tensile strength: | |
| +1500 N/5 cm (warp) | |
| +1400 Newton/5 cm (weft) | |
| Weight: 127 g/m² | |
| (2) Fabric from glass fibers: | |
| Glass type: Type e, glass with low alkali proportion, diameter: 2 microns | |
| Structure: Mock-leno weaving type | |
| Thickness: 0.41 + 0.05 mm. | |
| Weight: 350 g/m² + 6% | |
| Elongation: neglectible | |

Said reinforcements are embedded in the succeeding elastomer layers the intermediate part 3 is comprised of, and they allow lowering the elongation thereof and moreover substantially increasing the tearing strength thereof.

The polyurethane types according to examples 1 and 2 are also suitable for forming by gun-spraying, the plastic material part 6 shaped over pattern 1.

It must be understood that the invention is in no way limited to the particular embodiments as described hereinabove and that many changes may be brought therein without departing from the scope of the invention.

For instance, any plastic material type may be suitable for manufacturing the shaped part 6, as long as it may be applied by gun-spraying and allows to obtain a relatively flexible film which can be stripped fast from the mould and be accurately located inside the second finishing mould 7.

On the other hand, it is also possible to consider using a first mould obtained by other means than in the particular examples as given hereinabove. It is only necessary for this mould to have the negative impression of the pattern outer visible surface, and the shaping surface thereof, whereon the film or thin layer which is to comprise that shaped part corresponding to the pattern, to have the same surface as the pattern visible surface, that is to correspond as it were to the part or complete development of said surface.

I claim:

1. A method for preparing a shaped part of a plastic material by gun-spraying, which part is flexible or can be made flexible, from a particular pattern, comprising successively:
    (a) forming by gun-spraying a layer of plastic material over a shaping surface of a first mould which does not lengthen as it is distorted, said surface corresponding to the impression of the visible surface from the pattern deformed along substantially continuous lines without any elongation, in such a way that substantially all the surface portions from said mould be easily accessed for gun spraying;
    (b) then stripping said layer plastic material from the first mould surface;
    (c) laying said layer plastic material in a second mould, the shaping surface of which substantially coincides with the visible shape of said pattern; and
    (d) filling the cavity resulting from the layer plastic material shaped inside said second mould with a padding.

2. Method as defined in claim 1, which comprises using a first mould, the shaping surface of which corresponds to an outline distorted along substantially continuous lines, of the negative impression of the outer visible surface of said pattern.

3. Method as defined in claim 1, which comprises using a first mould made from a substantially rigid material.

4. Method as defined in claim 3, which comprises using a first mould obtained by electroplating.

5. Method as defined in claim 1, which comprises using a substantially rigid second mould, essentially made from a plurality of separable parts.

6. Method as defined in claim 1, which comprises applying by gun-spraying, a mixture from a polyol and an isocyanate over the shaping surface of the first mould, to obtain in situ a flexible polyurethane layer.

7. Method as defined in claim 1, which comprises using a first mould shaped from said pattern and made from a layer material, said layer being such as to make all the portions from the shaping surface thereof easily accessed for gun-spraying.

8. Method as defined in claim 1, which comprises using a first mould made from a plastic material reinforced with a low elongation-factor fabric.

9. Method as defined in claim 8, which comprises using as reinforcement for the plastic material, a fabric, netting or unwoven fabric from textile fibers or from glass fibers.

10. Method as defined in claim 1, which comprises using a rigid holding mould for said first mould.

11. Method as defined in claim 1, which comprises using a first mould with a thickness between 1 and 50 mm, and made on basis of a rubber with an elasticity modulus lower than or equal to 100 MPa, according to standards DIN 53423, and a Shore hardness lying between Shore A 23 and Shore D 45.

12. Method as defined in claim 11, which comprises using a first mould with a thickness between 3 and 15 mm, and made on the basis of a rubber with an elasticity modulus lower than or equal to 30 MPa and a Shore hardness lying between 30 and 85 Shore A.

13. Method as defined in claim 3, wherein said substantially rigid material is metal.

14. Method as defined in claim 9, wherein said textile fibers are polyester.

15. Method as defined in claim 10, wherein said first mould is made from plaster, a resin, or is formed by a laminated shell.

16. Method as defined in claim 10, wherein said first mold is a laminated shell reinforced with a reinforcement.

* * * * *